(12) United States Patent
Maiti et al.

(10) Patent No.: US 11,689,361 B1
(45) Date of Patent: Jun. 27, 2023

(54) DISTRIBUTED KEY EXPANSION

(71) Applicant: Xilinx, Inc., San Jose, CA (US)

(72) Inventors: Devanjan Maiti, Bengaluru (IN); Robert Bellarmin Susai, Hyderabad (IN); Jayaram Pvss, Hyderabad (IN)

(73) Assignee: XILINX, INC., San Jose, CA (US)

( * ) Notice: Subject to any disclaimer, the term of this patent is extended or adjusted under 35 U.S.C. 154(b) by 260 days.

(21) Appl. No.: 17/093,353

(22) Filed: Nov. 9, 2020

(51) Int. Cl.
*H04L 9/06* (2006.01)
*H04L 9/08* (2006.01)
*H03K 19/21* (2006.01)
*H04L 9/34* (2006.01)

(52) U.S. Cl.
CPC .......... *H04L 9/0861* (2013.01); *H03K 19/21* (2013.01); *H04L 9/0631* (2013.01); *H04L 9/34* (2013.01); *H04L 2209/12* (2013.01); *H04L 2209/24* (2013.01)

(58) Field of Classification Search
CPC . H04L 9/0861; H04L 9/0631; H04L 2209/12; H04L 2209/24; H03K 19/21
See application file for complete search history.

(56) References Cited

U.S. PATENT DOCUMENTS

2008/0019504 A1\* 1/2008 Han ..................... H04L 9/0631
380/28
2009/0060197 A1\* 3/2009 Taylor ................... H04L 9/0844
380/29
2010/0202608 A1\* 8/2010 Furuhashi ................. H04L 9/14
713/193

OTHER PUBLICATIONS

Advanced Encryption Standard, Tutorialspoint, https://www.turtorialspoint.com/cryptography/advanced_encryption_standard . . . , print date Sep. 22, 2020.
brainkart.com, AES Key Expansion, http://www.brainkart.com, copyright 2018.
Cast, AES-GCM, AES-GCM Authenticated Encrypt/Decrypt Core, www.cast-inc.com, download date Aug. 26, 2020, NJ, USA.
David A. McGrew and John Viega, The Galois/Counter Mode of Operation (GCM). Cisco Systems, Inc.: San Jose, CA; and Secure Software: Chantilly, VA Download date Aug. 26, 2020.
Advanced Encryption Standard (AES), Federal Information Processing Standards Publication 197, Nov. 26, 2001, http://www.nist.gov/CryptoToolkit.

\* cited by examiner

*Primary Examiner* — Ellen Tran
(74) *Attorney, Agent, or Firm* — Crawford Maunu PLLC

(57) ABSTRACT

N key generation circuits are arranged in a pipeline having N stages. Each key generation circuit is configured to generate a round key as a function of a respective input key and a respective round constant. Output signal lines that carry the round key from a key generation circuit in a stage of the pipeline, except the key generation circuit in a last stage of the pipeline, are coupled to the key generation circuit in a successive stage of the pipeline to provide the respective input key.

19 Claims, 5 Drawing Sheets

US 11,689,361 B1

DISTRIBUTED KEY EXPANSION

TECHNICAL FIELD

The disclosure generally relates to key expansion applied in multiple rounds of encryption/decryption.

BACKGROUND

In order to keep pace with continuing increases in bandwidth demands, processing that has been performed by a server CPU in earlier systems is being offloaded to newer network interface controllers (NICs). For example, some so-called "SmartNICs" perform cryptographic processing of network packets. Not only can SmartNICs offload some processing from a CPU, SmartNiCs can be achieve much greater throughput than a CPU in performing tasks such as those involved in cryptography.

An exemplary encryption method is the Advanced Encryption Standard (AES), which specifies an approach for encrypting/decrypting data in blocks of 128 bits. The AES can be supplemented with a Galois Counter Mode (GCM) to provide authenticated encryption (AES-GCM). Blocks of data to be encrypted are numbered sequentially, and each block number is combined with an initialization vector (IV) by an AES block cipher. A key generation mechanism starts with a new key for each block and generates a respective round key for each stage of the AES cipher based on the round key generated for the preceding stage.

SUMMARY

A disclosed circuit arrangement includes N key generation circuits arranged in a pipeline having N stages. Each key generation circuit is configured to generate a round key as a function of a respective input key and a respective round constant. Output signal lines that carry the round key from a key generation circuit in a stage of the pipeline, except the key generation circuit in a last stage of the pipeline, are coupled to the key generation circuit in a successive stage of the pipeline to provide the respective input key.

A disclosed method includes generating N round keys in parallel by N key generation circuits, respectively. The N key generation circuits are arranged in a pipeline having stages 0 through N−1, and each key generation circuit generates the respective round key as a function of a respective input key and a respective round constant. The method includes providing the round keys generated by the key generation circuits in stages 0 through N−2 as the input keys to the key generation circuit in stages 1 through N−1, respectively, and inputting the respective round constants in parallel to the key generation circuits by N constant-supplying circuits.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which.

DETAILED DESCRIPTION

Figure 1:
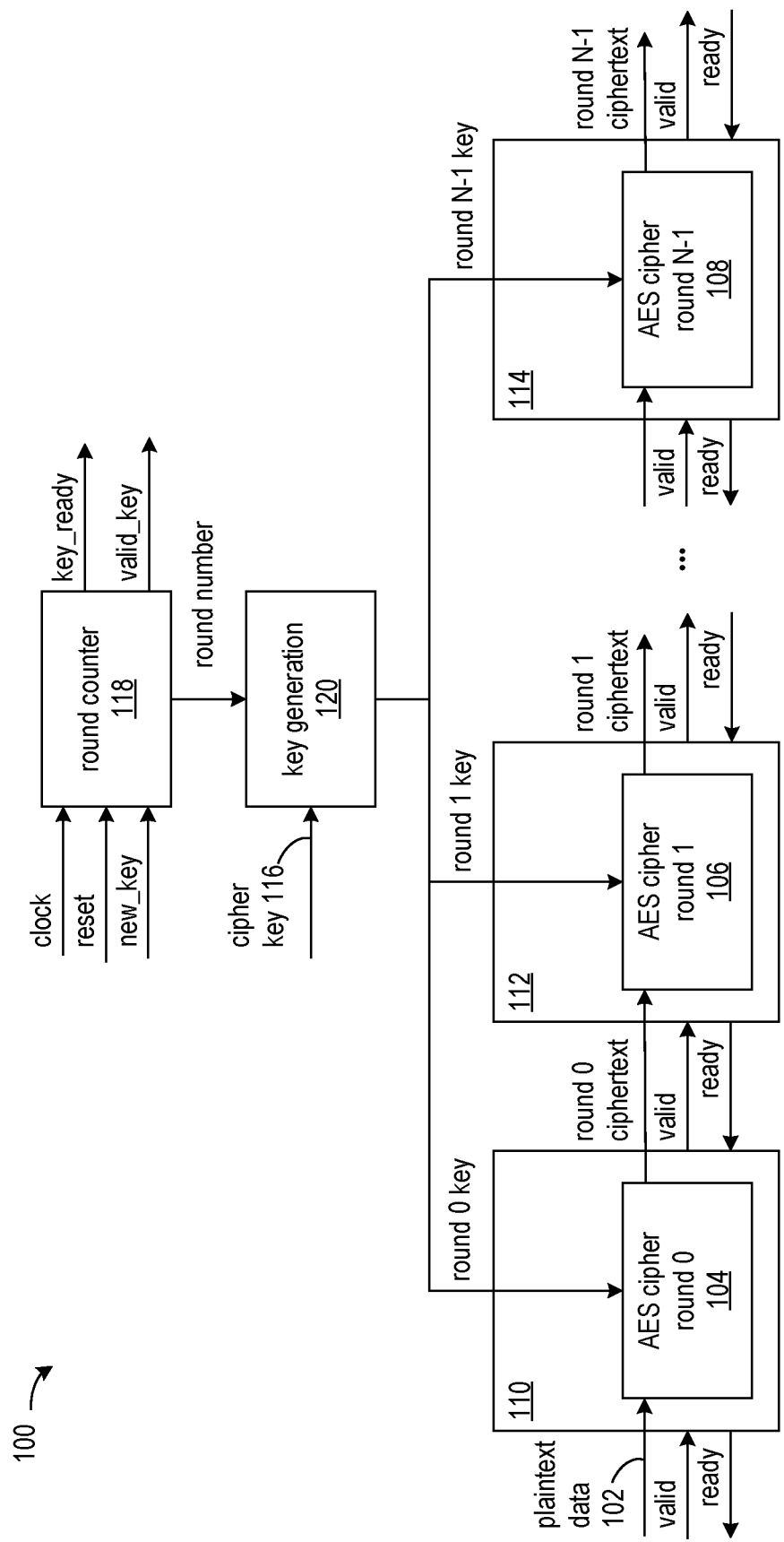
FIG. 1 illustrates a circuit arrangement that implements an AES cipher according to a prior approach.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Prior approaches to implementing AES cryptographic circuits have structured AES cipher blocks in pipelined circuitry. Each pipeline stage includes an AES cipher block that performs one of N rounds of encryption/decryption using round key. The round keys used by respective ones of the pipelined cipher blocks are provided by a central key generation circuit for all the AES cipher blocks according to prior approaches. A cryptographic circuit made according to prior approaches can exhibit stalls in processing, which thereby negatively affect throughput, due to the central key generation circuit. The central key generation circuit manages the change from the round keys used by the cipher blocks for an in-process block of data, to expansion of a new cipher key used to initiate cipher processing on a new block of data. Because the central key generation circuit provides the round keys to all the cipher blocks of the pipeline, before the central key generation circuit can begin generating round keys from a new cipher key for a new block of data, the last round key must first be provided to the last cipher block in the pipeline and the cipher block pipeline cleared. The clearing of the cipher block pipeline introduces stalls between processing of successive blocks, which can significantly reduce throughput in processing blocks of smaller sizes.

According to the disclosed circuits and methods, the round keys for the pipelined cipher circuits are generated by pipelined key generation circuits. Instead of a single circuit that generates the keys in a sequenced order for the pipelined cipher circuits, individual key generation circuits generate the round keys for the pipelined cipher circuits, respectively.

Each key generation circuit generates a new round key for an associated cipher circuit in the pipeline in response to input of the round key from the preceding key generation circuit in the pipeline. The initial or first key generation circuit in the pipeline generates a round key in response to the input cipher key that accompanies a new block of data to be processed. Blocks of data can be streamed into the pipeline without stalls, because the round keys are updated automatically as the processed data moves through the pipelined cipher circuits. Handshake signals that control the flow of data between the pipelined cipher circuits and input of a new block of data to process, effectively make the pipelined key generation circuits responsive to backpressure on the pipeline by controlling the input of a new data block and a new key to the initial key generation circuit in the pipeline.

FIG. 1 illustrates a circuit arrangement 100 that implements an AES cipher according to a prior approach. In this prior approach, central key generation circuitry generates the round keys to a pipeline of cipher blocks. The exemplary arrangement illustrates pipelined circuitry that encrypts input plaintext data 102.

The circuit arrangement 100 includes a pipeline of AES cipher circuits 104, 106, ..., 108. The stages of the pipeline are indicated by blocks 110, 112, ..., 114, which include control logic circuitry that controls movement of data between stages of the pipeline by way of valid and ready handshake signals.

For encryption, each of the cipher circuits 104, 106, ..., 108 performs one round of encryption. As recognized, each cipher round generally includes operations of byte substitution, row shifting, column mixing, and adding of a round key, except for the last round, which does not perform column mixing. For decryption, the four processes of encryption are performed in reverse order.

The number of rounds and number of cipher blocks in the pipeline depends on the size of the input cipher key, which in AES can be 128, 192, or 256 bits. A 128-bit cipher key requires 10 rounds, a 192-bit cipher key requires 12 rounds, and a 256-bit cipher key requires 14 rounds. The exemplary circuit arrangement shows N AES cipher blocks for N rounds, and the rounds are referenced as rounds 0 through N−1.

Central key generation circuitry generates the round keys 0 through N−1 that are used by the cipher circuits 104, 106, ..., 108 in performing rounds of encryption. The central key generation circuitry includes a round counter circuit 118 and a key generation circuit 120, which combine to produce one round key per clock cycle to coincide with the times at which the cipher circuits 104, 106, ..., 108 in the pipeline need the generated round keys.

The round counter circuit 118 generates a round number and provides the round number to the key generation circuit 120. The key generation circuit can use the round number to select the round constant to use in generating the round key. The key generation circuit can also use the round number to select which one of the cipher blocks to which the generated round key should be directed. The round counter is paced by an input clock signal, and restarts counting at round 0 in response to a reset signal and new_key signal.

The key_ready signal indicates that a new set of round keys are ready to be consumed by the cipher circuitry for an inbound block of data. The key_ready signal ensures that the cipher circuitry starts processing the data block only when the corresponding round keys are ready. The valid_key signal remains asserted for the duration of the new set of round keys being generated. The valid_key signal ensures that the logic that is storing/registering the round keys for use by the cipher circuits 104, 106, ..., 108 knows when those keys are valid and does not register erroneous information when key generation is idle.

The circuit arrangement 100 experiences stalls when a new cipher key 116 is input to the key generation circuit 120 to commence encryption of another block of data using expansion of the new cipher key. Before the round counter 118 can reset counting from round 0 and the key generation circuit 120 can generate the round 0 key for cipher block 0, round key N−1 must first be provided to cipher circuit N−1 in the pipeline and the cipher block pipeline cleared. Once cipher circuit N−1 has output the round N−1 cipher text, expansion of the new cipher key can begin. Because the pipeline is cleared with input of a new cipher key, output of valid ciphertext from cipher circuit N−1 will be delayed by the time involved in processing the data through the N−1 stages of the pipeline.

Figure 2:
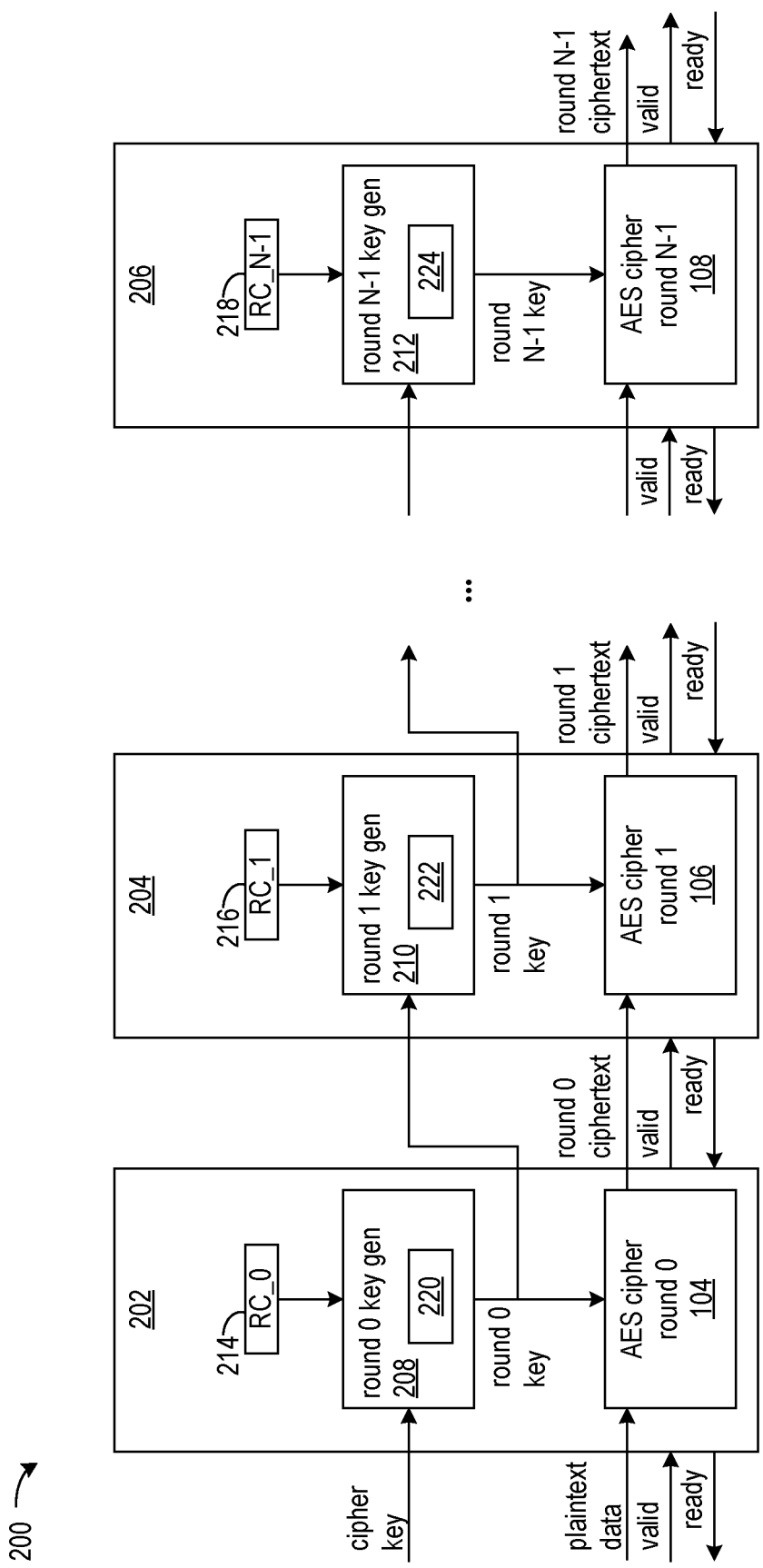
FIG. 2 shows a circuit arrangement that implements an AES cipher consistent with the disclosed innovations.

FIG. 2 shows a circuit arrangement 200 that implements an AES cipher consistent with the disclosed innovations. Instead of the central iterative key expansion as exemplified in FIG. 1, the circuit arrangement 200 employs multiple key generation circuits that are arranged in a pipeline. The key generation circuits can generate round keys in parallel, and because the key generation circuits are pipelined, the number of different ciphers keys undergoing expansion in the pipeline is equal to the number of rounds. A new data block and cipher key can be input with every pipeline cycle.

The stages of the pipeline are illustrated as blocks 202, 204, ..., 206, and valid and ready signals are used to control movement of ciphertext between stages of the pipeline as in the circuit arrangement 100 of FIG. 1. The stages of the pipeline include respective cipher circuits 104, 106, ..., 108 for N rounds numbered 0 through N−1.

The stages 202, 204, ..., 206 of the pipeline include respective key generation circuits 208, 210, ..., 212. Each of the key generation circuits generates the round key for the cipher circuit in the same pipeline stage. Key generation circuit 208 generates the round 0 expansion of the cipher key based on the round constant of round 0 for input to the cipher circuit 104, key generation circuit 210 generates the round 1 expansion of the cipher key based on the round 0 key and the round constant of round 1 for input to cipher circuit 106, ..., and key generation circuit 212 generates the round N−1 expansion of the cipher key based on the round N−2 key and the round constant of round N−1 for input to cipher circuit 108.

The number of stages in the pipeline depends on the size of the cipher key. For a 128-bit cipher key in AES, the circuit arrangement 200 would have 10 stages for 10 rounds of key expansion, for a 192-bit cipher key in AES, the circuit arrangement 200 would have 12 stages for 12 rounds of key expansion, and for a 256-bit cipher key in AES, the circuit arrangement 200 would have 14 stages for 14 rounds of key expansion.

Each key generation circuit generates separate sets of words of the expansion of the cipher key, which is input to first stage ("stage 0" 202) of the pipeline. For example, according to AES key expansion the rounds can be numbered as rounds 0 through N−1. Similarly, the pipeline stages can be referenced as stages 0 through N−1. Thus, for a 128-bit cipher key, the key generation circuit in stage J is configured to generate words, J*4 through J*4+3 of expansion of the cipher key. For a 192-bit cipher key, the key generation circuit in stage J is configured to generate words, J*6 through J*4+6, of expansion of the cipher key. For a 256-bit cipher key, the key generation circuit in stage J is configured to generate words, J*8 through J*4+8, of expansion of the cipher key.

The registers 220, 222, ..., 224 can stage the respective round keys for successive stages in the pipeline. Though key generation circuit 212 can have an associated register 224 as a result of the key generation circuits 208, 210, ..., 212 being generated from the same design module, the output signals from register 224 are not connected to a key generation circuit in another stage, as key generation circuit 212 is in the last stage of the pipeline.

Each of the pipeline stages 202, 204, ..., 206 can have respective circuitry 214, 216, ..., 218 that supplies constants to the key generation circuits 210, 212, ..., 214.

The constant values can be provided by circuitry that connects power supply rails to the constant inputs of the key generation circuits according to the desired values of the round constants. For example, a bit value of 1 of a constant can be provided by connecting to a power rail having a first voltage level, and a bit value of 0 can be provided by connecting to a power rail having a second voltage level that is different from the first voltage level. Alternatively, the constant-supplying circuitry 214, 216, . . . , 218 can be implemented as registers that are reconfigurable.

The output signal lines that carry the generated round key from a key generation circuit in a stage of the pipeline, except for the last stage in the pipeline, are coupled to the key generation circuit in a successive stage of the pipeline to provide the input key. For example, signal lines that carry the round 0 key generated by key generation circuit 208 are coupled to the key generation circuit 210 to provide the input key to key generation circuit 210. But signal lines that carry the round N−1 key generated by key generation circuit 212 in the last stage 206 are not coupled to provide input to another key generation circuit.

The cipher circuits 104, 106, . . . , 108 generate ciphertext from input data using the round keys from the key generation circuits in the pipeline stages, respectively. Each cipher circuit, except the last cipher circuit 114 in the pipeline, provides the generated ciphertext as the input data to a cipher circuit in a successive stage of the pipeline. For example, cipher circuit 104 provides round 0 cipher text as input data to cipher circuit 106.

Control logic circuitry in the pipeline stages 202, 204, . . . , 206 controls movement of data between stages of the pipeline by way of valid and ready handshake signals. A valid signal input to a pipeline stage and cipher circuit indicates whether or not the input data to the cipher circuit is valid. A ready signal input to a pipeline stage and the cipher circuit indicates whether or not the receiving circuit, such as the cipher circuit in the next stage of the pipeline or the circuit that receives the final output, is ready for the input data. Each cipher circuit generates ciphertext in response to the input valid signal indicating the input data is valid, and the input ready signal indicating the receiving circuit is ready.

Though the circuit arrangement 200 illustrates a pipeline arrangement that encrypts input blocks of plaintext. It will be appreciated that a pipeline arrangement that decrypts input blocks of ciphertext can be made using instances of key generation circuits consistent with the pipelined arrangement of key generation circuits 208, 210, . . . , 212, and implementing cipher circuits that decrypt input data blocks instead of cipher circuits that encrypt input data blocks.

Figure 3:
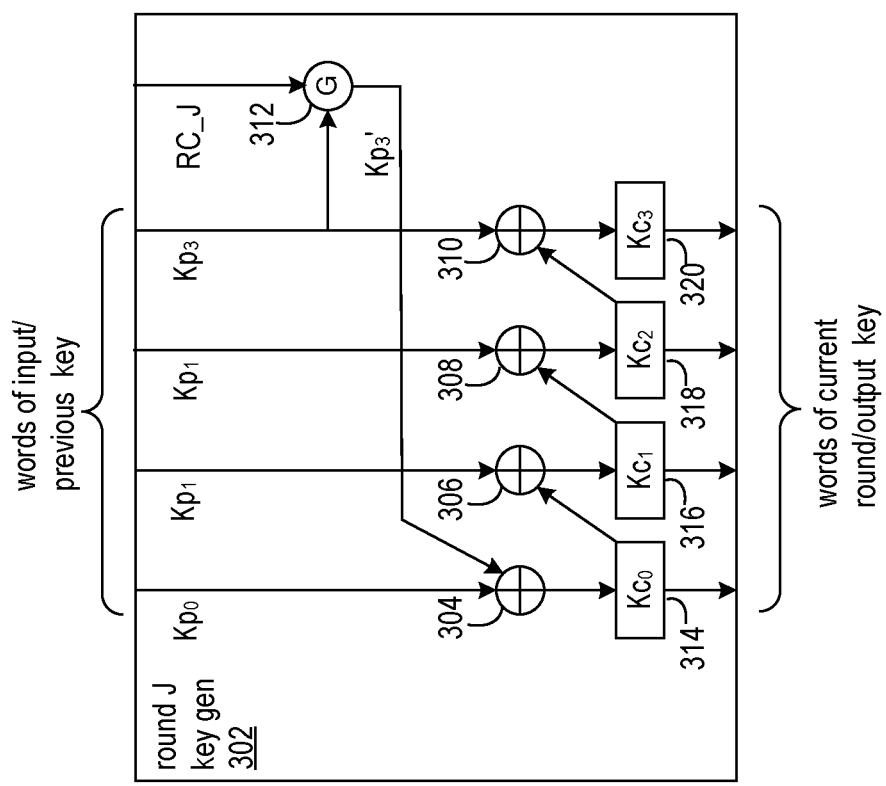
FIG. 3 shows an exemplary key generation circuit configured to generate the round key for round J of N rounds of expansion.

FIG. 3 shows an exemplary key generation circuit 302 configured to generate the round key for round J ($0 \leq J \leq N-1$). The key generation circuits 208, 210, . . . , 212 of FIG. 2 are instances of the key generation circuit 302.

The key generation circuit 302 includes circuitry that implements one round of AES key expansion. The example is for a 4-word input key (128-bits). It will be recognized that key generation circuit 302 can be expanded to support 6-word and 8-word input keys. The M words of an input key can be referenced as words 0 through M−1.

The words of the input key are shown as words $Kp_0, \ldots, Kp_3$ For stage 0, the input key is the cipher key. For stage J, where $1 \leq J \leq N-1$, the input key is the round key output from the key generation circuit in the pipeline stage J−1 (the "preceding stage"). The round constant input to the key generation circuit of round J, for $0 \leq J \leq N-1$, is shown as RC_J.

The key generation circuit 302 includes XOR circuits 304, 306, 308, and 310, a transformation circuit 312 ("G"), and registers 314, 316, 318, and 320. The numbers of XOR circuits and registers correspond the number of words of the input key. For an M-word input key, the XOR circuits can be referenced as XOR circuits 0 through M−1, and the registers can be referenced as registers 0 through M−1. The registers 314, . . . , 320 store words 0 through M−1 of the output key for M=4.

The transformation circuit 312 transforms word M−1 of the input key ($Kp_3$) into a transformed word ($Kp_3'$) as a function of a byte-wise circular shift of word M−1, followed by a byte substitution, followed by an XOR with the respective round constant.

XOR circuit 304 (XOR circuit 0 of M XOR circuits) applies an exclusive-or function to the transformed word ($Kp_3'$) and $Kp_0$ (word 0 of the M-word input key) and stores the result $Kc_0$ as word 0 of the M-word of the output round key in register 314 (register 0 of the M registers).

The XOR circuits 306, 308, 310 (XOR circuits 1 through M−1 of M XOR circuits) apply an exclusive-or functions to words $Kp_1$, $Kp_2$, and $Kp_3$ of the input key (word i of the input key for $1 \leq i \leq M-1$) with outputs from registers 314, 316, 318 (register i−1 of M registers for $1 \leq i \leq M-1$) to generate words $Kc_1$, $Kc_2$, and $Kc_3$ of the round key (words 1 through M−1 of M words), and store the round key words in registers 316, 318, and 320 (registers 1 through M−1 of M registers), respectively.

Figure 4:
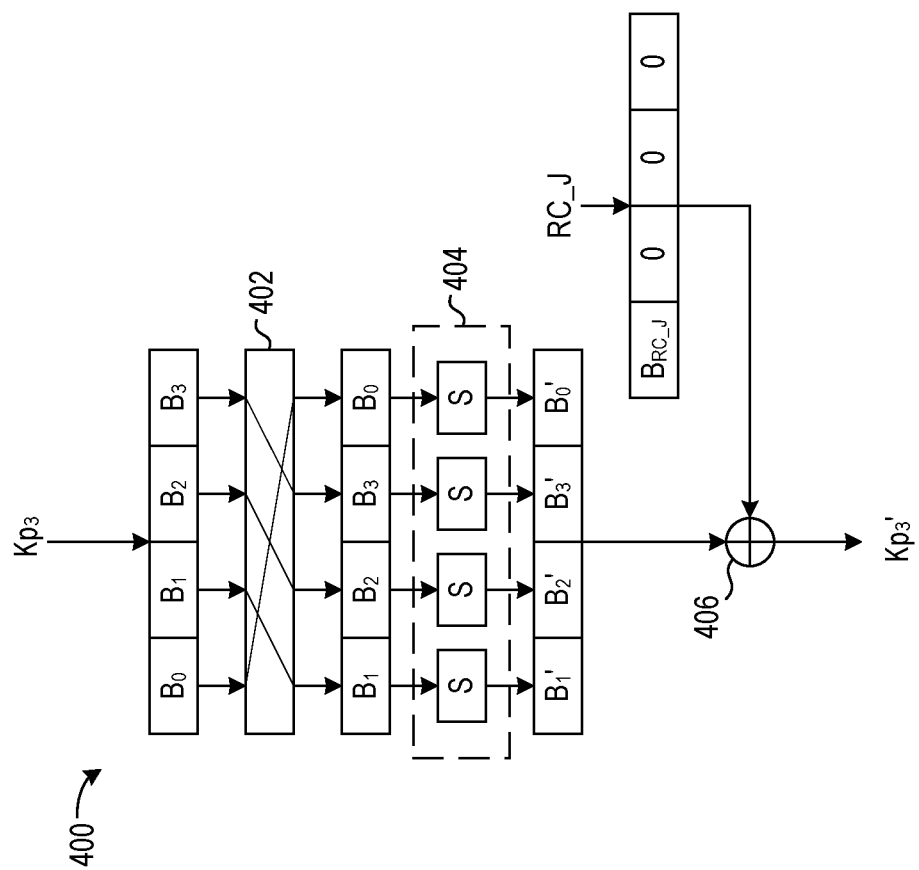
FIG. 4 shows a transformation circuit that implements the transformation function of the key generation circuit.

FIG. 4 shows a transformation circuit 400 that implements the transformation circuit 312 of FIG. 3. The transformation circuit inputs word $Kp_3$ (word M−1) of the input key and operates on bytes $B_0$, $B_1$, $B_2$, and $B_3$, of the input word.

Circuit 402 performs a cyclic shift of bytes $B_0$, $B_1$, $B_2$, and $B_3$, and the result is the bytes ordered as $B_1$, $B_2$, $B_3$, and $B_0$. Circuits 404 perform table look-ups of bytes provide the substituted bytes $B_1'$, $B_2'$, $B_3'$, and $B_0'$ to the XOR circuit 406.

The XOR circuit 406 applies an exclusive-or function on the substituted bytes $B_1'$, $B_2'$, $B_3'$, and $B_0'$ and the input round constant RC_J. The input round constant is a word in which the three rightmost bytes are always zero-value bytes, which results in the XOR function being applied on only the left-most byte of the word ($B_1'$). The non-zero-byte $B_{RC\_J}$ of the round constant RC_J is different in each round and is defined by the AES-GCM standard. The output from the XOR circuit 406 is the transformed word $Kp_3'$, which is input to XOR circuit 0 (304) of the key generation circuit 302 (FIG. 3)

Figure 5:
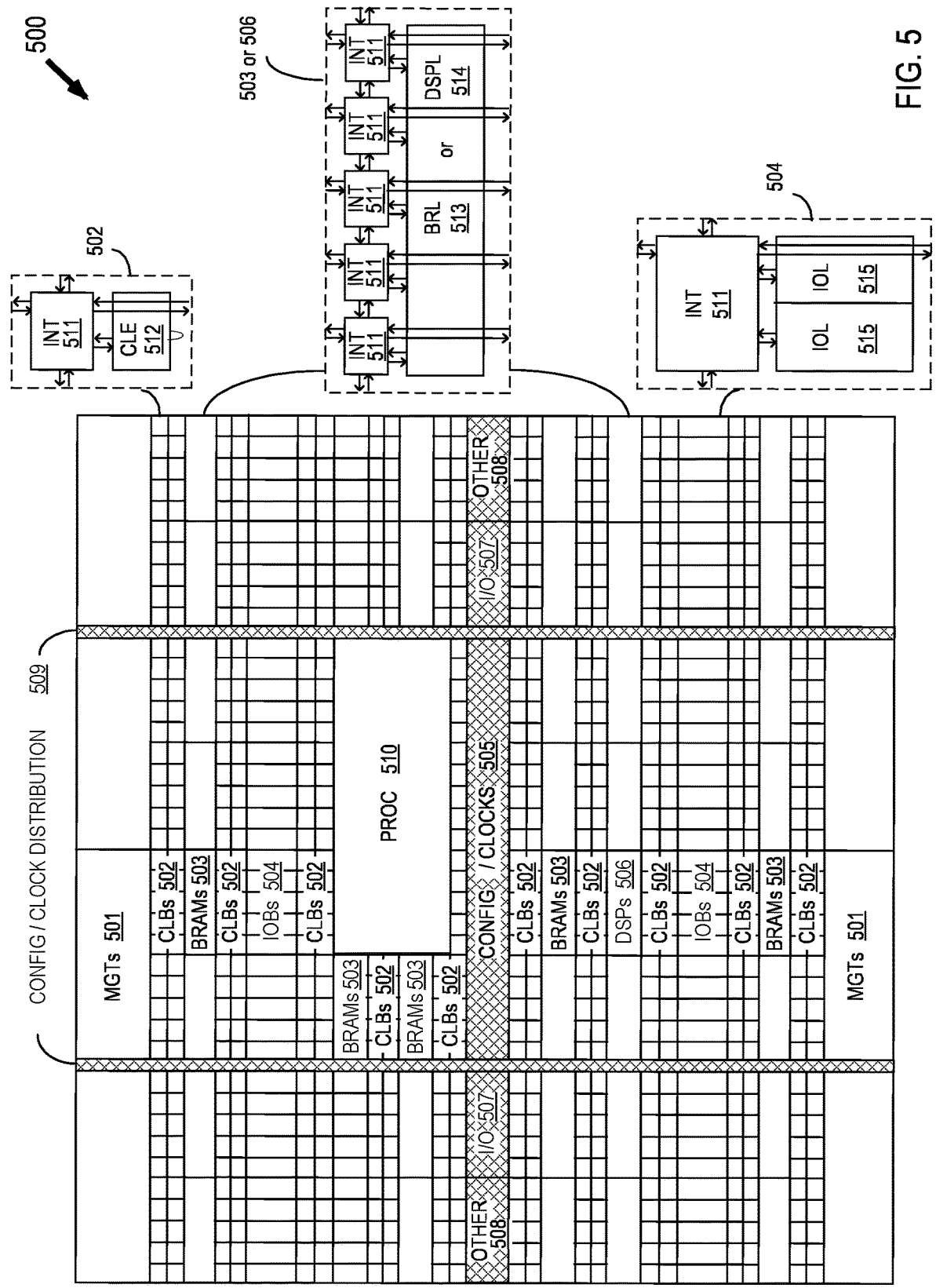
FIG. 5 shows a programmable integrated circuit on which the disclosed circuits and processes may be implemented.

FIG. 5 shows a programmable integrated circuit (IC) 500 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown). Circuits consistent with the disclosed approaches can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic, plus a single programmable interconnect element INT 511. A BRAM 503 can include a BRAM logic element (BRL) 513 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O bond pads connected, for example, to the I/O logic element 515, are manufactured using metal layered above the various illustrated logic blocks, and typically are not confined to the area of the input/output logic element 515.

A columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Figure 6:
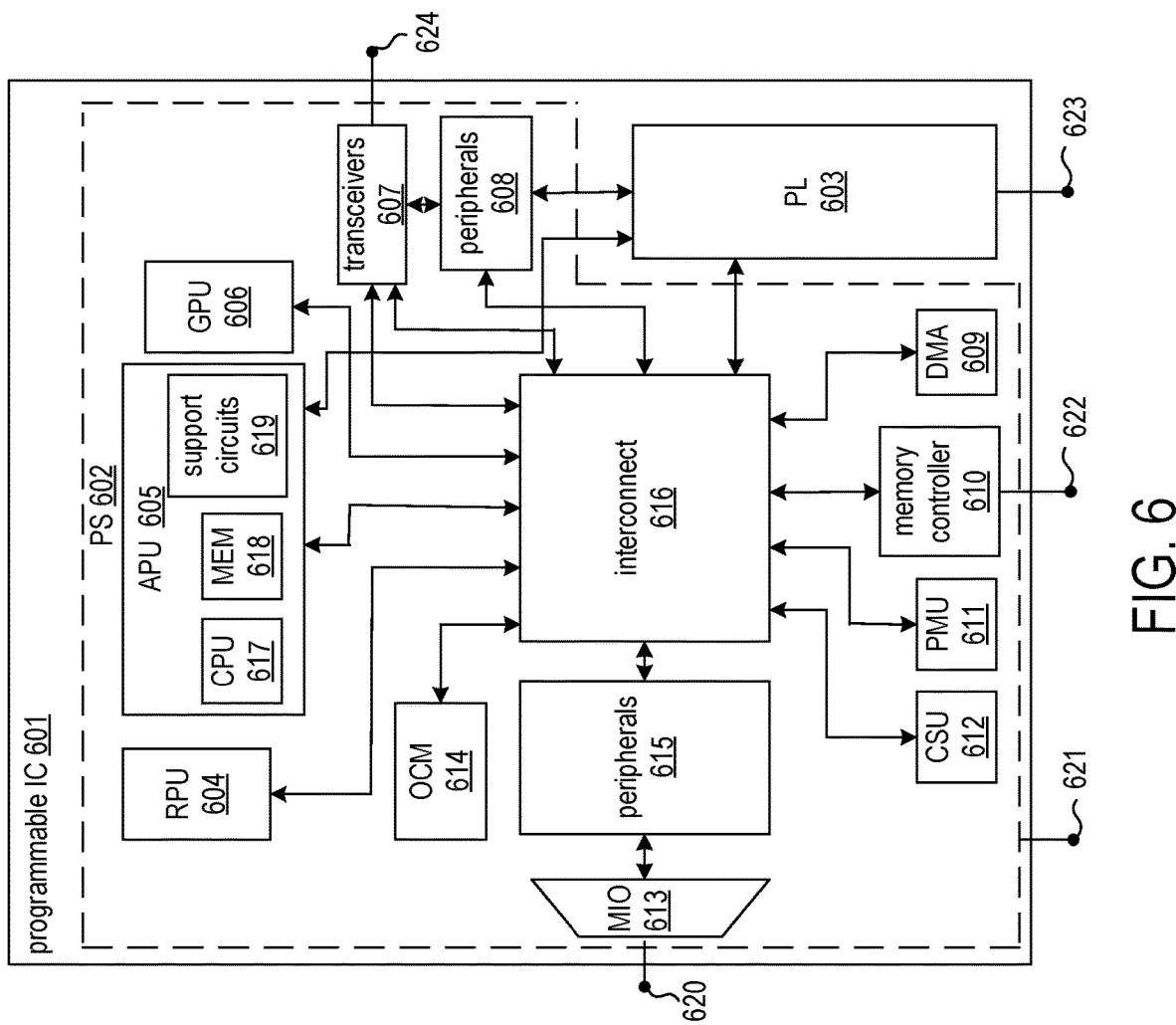
FIG. 6 is a block diagram of an exemplary System-on-Chip that can host the disclosed circuits and methods.

FIG. 6 is a block diagram of an exemplary System-on-Chip (SoC) 601 that can host the disclosed circuits and methods. In the example, the SoC includes the processing subsystem (PS) 602 and the programmable logic subsystem 603. The processing subsystem 602 includes various processing units, such as a real-time processing unit (RPU) 604, an application processing unit (APU) 605, a graphics processing unit (GPU) 606, a configuration and security unit (CSU) 612, and a platform management unit (PMU) 611. The PS 602 also includes various support circuits, such as on-chip memory (OCM) 614, transceivers 607, peripherals 608, interconnect 616, DMA circuit 609, memory controller 610, peripherals 615, and multiplexed (MIO) circuit 613. The processing units and the support circuits are interconnected by the interconnect 616. The PL subsystem 603 is also coupled to the interconnect 616. The transceivers 607 are coupled to external pins 624. The PL 603 is coupled to external pins 623. The memory controller 610 is coupled to external pins 622. The MIO 613 is coupled to external pins 620. The PS 602 is generally coupled to external pins 621. The APU 605 can include a CPU 617, memory 618, and support circuits 619. The APU 605 can include other circuitry, including L1 and L2 caches and the like. The RPU 604 can include additional circuitry, such as L1 caches and the like. The interconnect 616 can include cache-coherent interconnect or the like.

Referring to the PS 602, each of the processing units includes one or more central processing units (CPUs) and associated circuits, such as memories, interrupt controllers, direct memory access (DMA) controllers, memory management units (MMUs), floating point units (FPUs), and the like. The interconnect 616 includes various switches, busses, communication links, and the like configured to interconnect the processing units, as well as interconnect the other components in the PS 602 to the processing units.

The OCM 614 includes one or more RAM modules, which can be distributed throughout the PS 602. For example, the OCM 614 can include battery backed RAM (BBRAM), tightly coupled memory (TCM), and the like. The memory controller 610 can include a DRAM interface for accessing external DRAM. The peripherals 608, 615 can include one or more components that provide an interface to the PS 602. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 615 can be coupled to the MIO 613. The peripherals 608 can be coupled to the transceivers 607. The transceivers 607 can include serializer/deserializer (SERDES) circuits, MGTs, and the like.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of cryptographic applications. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement comprising:
a plurality of N key generation circuits arranged in a pipeline having N stages;
wherein each key generation circuit is configured to generate a round key as a function of a respective input key and a respective round constant;
wherein each key generation circuit has a respective set of signal lines coupled to first and second power rails to provide the respective round constant, the first power rail has a voltage level indicative of a bit value 1, and the second power rail has a voltage level indicative of a bit value 0; and
wherein output signal lines that carry the round key from the key generation circuit in a stage of the N stages of the pipeline, except the key generation circuit in a last stage of the N stages of the pipeline, are coupled to the key generation circuit in a successive stage of the pipeline to provide the respective input key.

2. The circuit arrangement of claim 1, wherein:
each respective input key comprises M words referenced as words 0 through M−1, and each respective round key comprises M words referenced as words 0 through M−1;
each key generation circuit includes:
M registers referenced as registers 0 through M−1 and configured to store the M words of the respective round key;
a transformation circuit configured to transform word M−1 of the respective input key into a transformed word as a function of a byte-wise circular shift of word M−1, followed by a byte substitution, followed by an XOR with the respective round constant; and
M XOR circuits referenced as XOR circuits 0 through M−1, wherein:
XOR circuit 0 is configured to XOR the transformed word with word 0 of the respective input key to generate word 0 of the respective round key and store word 0 of the respective round key in register 0, and
each of XOR circuits 1 through M−1 is configured to XOR word i of the respective input key with output from register i−1, for 1≤i≤M−1, to generate words 1 through M−1 of the respective round key, respectively, and store words 1 through M−1 of the respective round key in registers 1 through M−1, respectively.

3. The circuit arrangement of claim 1, further comprising:
N cipher circuits arranged in the N stages of the pipeline and coupled to the N key generation circuits, respectively, each cipher circuit configured to generate ciphertext from input data using the respective round key from the respective key generation circuit, and each cipher circuit, except the cipher circuit in a last stage of the pipeline, configured to provide the ciphertext as the input data to the cipher circuit in a successive stage of the pipeline.

4. The circuit arrangement of claim 3, wherein:
a respective valid signal input to each cipher circuit indicates whether or not the input data to the cipher circuit is valid;
a respective ready signal input to each cipher circuit indicates whether or not a receiving cipher circuit is ready for the input data; and
each cipher circuit is configured to generate the ciphertext in response to the respective valid signal indicating the input data is valid, and the respective ready signal indicating the receiving circuit is ready.

5. The circuit arrangement of claim 1, wherein:
the N stages of the pipeline include stages 0 through N−1;
the input key to the key generation circuit in stage 0 is a 128-bit cipher key;
the round keys are associated with rounds numbered 0 through N−1; and
the key generation circuit in stage J of the N key generation circuits is configured to generate words, J*4 through J*4+3 of expansion of the cipher key.

6. The circuit arrangement of claim 1, wherein:
the N stages of the pipeline include stages 0 through N−1;
the input key to the key generation circuit in stage 0 is a 192-bit cipher key;
the round keys are associated with rounds numbered 0 through N−1; and
the key generation circuit of round J of the N key generation circuits is configured to generate words, J*6 through J*4+6, of expansion of the cipher key.

7. The circuit arrangement of claim 1, wherein:
the N stages of the pipeline include stages 0 through N−1;
the input key to the key generation circuit in stage 0 is a 256-bit cipher key;
the round keys are associated with rounds numbered 0 through N−1; and
the key generation circuit of round J of the N key generation circuits is configured to generate words, J*8 through J*4+8, of expansion of the cipher key.

8. The circuit arrangement of claim 1, wherein the N key generation circuits are configured to generate respective round keys in parallel based on expansions of different cipher keys.

9. The circuit arrangement of claim 1 further comprising:
N cipher circuits arranged in the N stages of the pipeline and coupled to the N key generation circuits, respectively, each cipher circuit configured to generate plaintext from input data using the respective round key from the respective key generation circuit, and each cipher circuit, except a last cipher circuit in the pipeline, configured to provide the plaintext as the input data to a cipher circuit in a successive stage of the pipeline.

10. The circuit arrangement of claim 9, wherein the N key generation circuits are configured to generate respective round keys in parallel based on expansions of different cipher keys.

11. The circuit arrangement of claim 1, further comprising:
N cipher circuits arranged in the N stages of the pipeline and coupled to the N key generation circuits, respectively, each cipher circuit configured to generate ciphertext from input data using the respective round key from the respective key generation circuit, and each cipher circuit, except a last cipher circuit in the pipeline, configured to provide the ciphertext as the input data to a cipher circuit in a successive stage of the pipeline; and
wherein the N key generation circuits are configured to generate respective round keys in parallel based on expansions of different cipher keys.

12. A method, comprising:
generating N round keys in parallel by N key generation circuits, respectively, wherein the N key generation circuits are arranged in a pipeline having stages 0 through N−1, and each key generation circuit generates the respective round key as a function of a respective input key and a respective round constant;

providing the round keys generated by the key generation circuits in stages 0 through N−2 as the input keys to the key generation circuit in stages 1 through N−1, respectively; and inputting the respective round constants in parallel to the key generation circuits by respective sets of signal lines coupled to first and second power rails to provide the respective round constants, wherein the first power rail has a voltage level indicative of a bit value 1, and the second power rail has a voltage level indicative of a bit value 0.

13. The method of claim 12, wherein each respective input key comprises M words referenced as words 0 through M−1, each respective round key comprises M words referenced as words 0 through M−1, and each key generation circuit includes M registers referenced as registers 0 through M−1 and M XOR circuits referenced as XOR circuits 0 through M−1, and the method further comprising:

storing the M words of the respective round key in the M registers by each key generation circuit;

transforming by respective transformation circuits of the key generation circuits, word M−1 of the respective input key into a transformed word as a function of a byte-wise circular shift of word M−1, followed by a byte substitution, followed by an XOR with the respective round constant;

applying an exclusive-or function by XOR circuit 0 of each key generation circuit, to the transformed word and word 0 of the respective input key to generate word 0 of the respective round key, and storing word 0 of the respective round key in register 0 of the key generation circuit; and applying exclusive or functions by XOR circuits 1 through M−1 of each key generation circuit, to word i of the respective input key and output from register i−1, for $1 \leq i \leq M-1$, to generate words 1 through M−1 of the respective round key, respectively, and storing words 1 through M−1 of the respective round key in registers 1 through M−1, respectively, of the key generation circuit.

14. The method of claim 12, further comprising:

generating, by each of N cipher circuits arranged in the N stages of the pipeline and coupled to the N key generation circuits, respectively, ciphertext from input data using the respective round key from the respective key generation circuit;

providing by each cipher circuit, except a last cipher circuit in the pipeline, the ciphertext as the input data to a cipher circuit in a successive stage of the pipeline;

inputting a respective valid signal to each cipher circuit to indicate whether or not the input data to the cipher circuit is valid;

inputting a respective ready signal to each cipher circuit to indicate whether or not a receiving cipher circuit is ready for the input data; and generating by each cipher circuit, the ciphertext in response to the respective valid signal indicating the input data is valid, and the respective ready signal indicating the receiving circuit is ready.

15. The method of claim 12, wherein:

the N stages of the pipeline include stages 0 through N−1;

the input key to the key generation circuit in stage 0 is a 128-bit cipher key;

the round keys are associated with rounds numbered 0 through N−1; and the method further comprising, generating by the key generation circuit in stage J of the N key generation circuits, words, J*4 through J*4+3 of expansion of the cipher key.

16. The circuit arrangement of claim 12, wherein:

the N stages of the pipeline include stages 0 through N−1;

the input key to the key generation circuit in stage 0 is a 192-bit cipher key;

the round keys are associated with rounds numbered 0 through N−1; and the method further comprising, generating by the key generation circuit of round J of the N key generation circuits, words, J*6 through J*4+6, of expansion of the cipher key.

17. The method of claim 12, wherein:

the N stages of the pipeline include stages 0 through N−1;

the input key to the key generation circuit in stage 0 is a 256-bit cipher key;

the round keys are associated with rounds numbered 0 through N−1; and the method further comprising, generating by the key generation circuit of round J of the N key generation circuits, words, J*8 through J*4+8, of expansion of the cipher key.

18. The method of claim 12, wherein the N key generation circuits are configured to generate respective round keys in parallel based on expansions of different cipher keys.

19. The method of claim 12 further comprising:

generating, by each of N cipher circuits arranged in the N stages of the pipeline and coupled to the N key generation circuits, respectively, plaintext from input data using the respective round key from the respective key generation circuit;

providing by each cipher circuit, except a last cipher circuit in the pipeline, the plaintext as the input data to a cipher circuit in a successive stage of the pipeline;

inputting a respective valid signal to each cipher circuit to indicate whether or not the input data to the cipher circuit is valid;

inputting a respective ready signal to each cipher circuit to indicate whether or not a receiving cipher circuit is ready for the input data; and generating by each cipher circuit, the plaintext in response to the respective valid signal indicating the input data is valid, and the respective ready signal indicating the receiving circuit is ready.

\* \* \* \* \*